May 25, 1965 D. L. LOMBARD 3,185,769

TELEPHONE MESSAGE TIME RECORDING APPARATUS

Filed March 30, 1961 3 Sheets-Sheet 1

INVENTOR
Daniel L. Lombard
BY [signature]
ATTORNEY

May 25, 1965 D. L. LOMBARD 3,185,769

TELEPHONE MESSAGE TIME RECORDING APPARATUS

Filed March 30, 1961 3 Sheets-Sheet 2

INVENTOR

Daniel L. Lombard

BY

ATTORNEY

TELEPHONE MESSAGE TIME RECORDING APPARATUS

Filed March 30, 1961

INVENTOR
Daniel L.Lombard
BY [signature]
ATTORNEY

United States Patent Office 3,185,769
Patented May 25, 1965

3,185,769
TELEPHONE MESSAGE TIME RECORDING APPARATUS

Daniel L. Lombard, 639 Wick Ave., Youngstown, Ohio
Filed Mar. 30, 1961, Ser. No. 99,563
5 Claims. (Cl. 179—7.1)

The present invention relates generally to accessory apparatus for telephone equipment and more particularly to apparatus for recording information such as the identity of the party called, the time and cost of a telephone call.

Although the present invention is applicable to various types of equipment for communication purposes wherein it is desirable to record the date, time, length and cost of a particular communication, it is particularly useful in connection with a telephone that is used for long distance calls, either dialed direct or through a telephone operator.

For obvious reasons it is highly desirable to have a record of all long distance calls at a particular telephone location. Such a record is not only useful for bookkeeping purposes but also tends to make the telephone caller cost-conscious. At the same time the present invention has a utilitary value as an accessory desk clock when the telephone is not in use. Furthermore, the invention comprises a highly useful tool for those in the legal and other similar professions where it is desirable to record the length of telephone calls to or from clients regardless of whether those calls be local or long distance.

An object of the present invention is to provide auxiliary apparatus for communication equipment capable of registering desirable indicia relative to each particular communication.

Another object of the invention is to provide auxiliary telephone apparatus for indicating the starting time, elapsed time, identity of the party called and cost rate of the telephone call.

A further object of the invention is to provide apparatus to indicate the month, day of the month, hour, and minute when a telephone call is made.

A still further object of the invention is to provide means for recording desirable information relative to a long distance telephone call which is adapted to be manually manipulated to identify the person to be called and the cost rates for the area to be called, as well as means responsive to a synchronous time keeping mechanism for recording such information and additionally indexing a record sheet for recording the incremental cost rate for timed intervals thereafter until termination of the call.

Further objects and advantages of the present invention will be readily apparent from the following detailed description taken in conjunction with the drawings in which.

Figure 1:
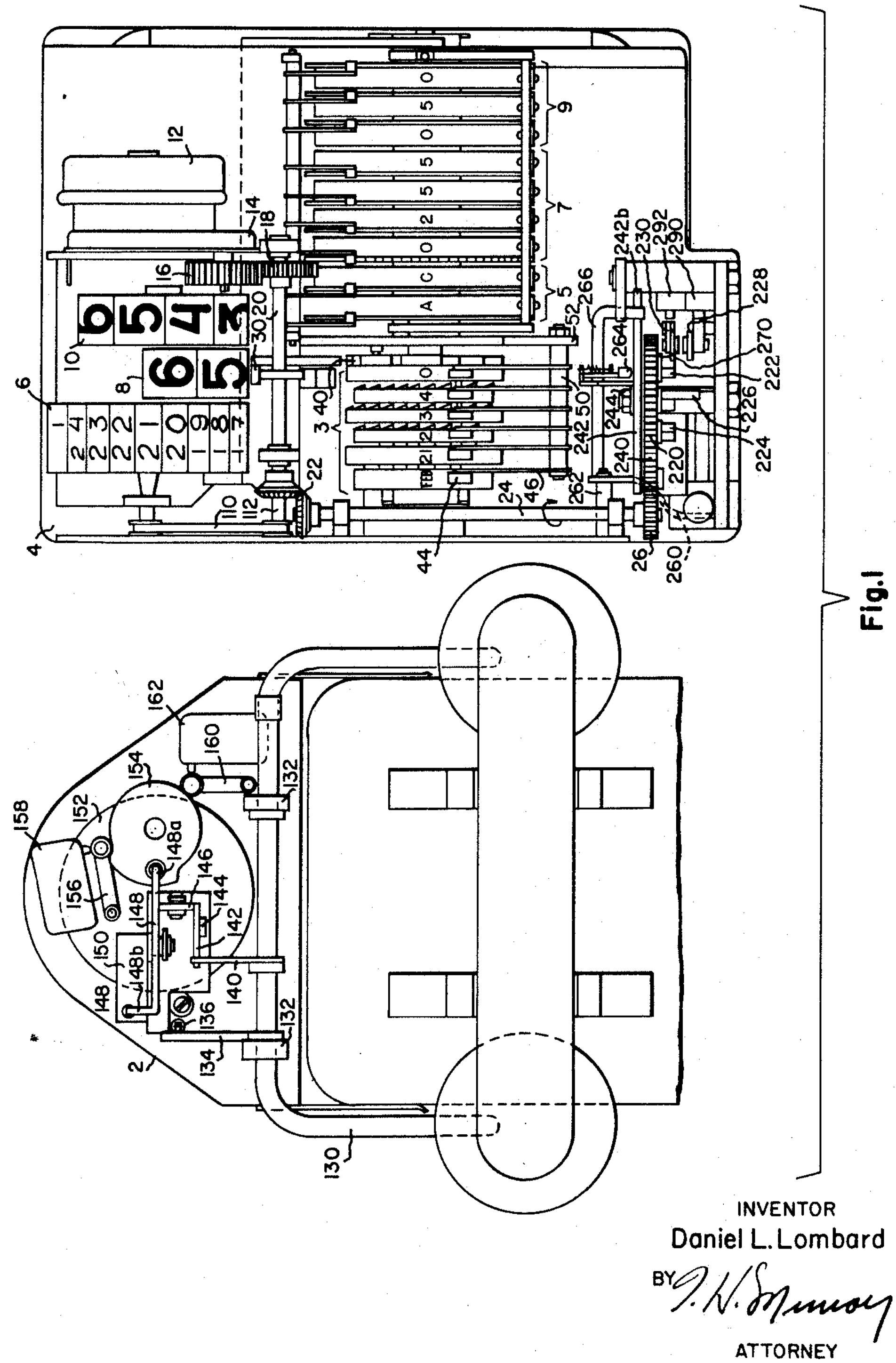
FIGURE 1 is a plan view of an illustrative embodiment of the present invention with the top covers removed.

An illustrative embodiment of the present invention is shown in FIG. 1 comprising an attachment member 2 clamped to or positioned adjacent the base portion of the telephone, and a recording mechanism 4 located adjacent thereto. When the telephone is not in use, the mechanism 4 provides a visual indication of the time of day by means of a twenty-four-sided hour disc 6, a six-sided ten-minute disc 8 and ten-sided minute disc 10, all drivably connected to a synchronous motor 12 of constant speed. The discs 6, 8 and 10 rotate in speedometer fashion to provide a continual indication of the time of day.

In order to provide a record of the desired information relative to a particular long distance call, a plurality of discs are disposed in sections across the mechanism 4. The first section 3 of discs, indicating the month, day of the month, hour of the day and minutes, is driven by the synchronous motor 12. The remaining sections are manually set to provide in the second section 5 the initials of the person to be called, in the third section 7 the three-minute cost rate of the proposed long distance call, and in the fourth section 9 the incremental cost rate per minute thereafter.

Figure 3:
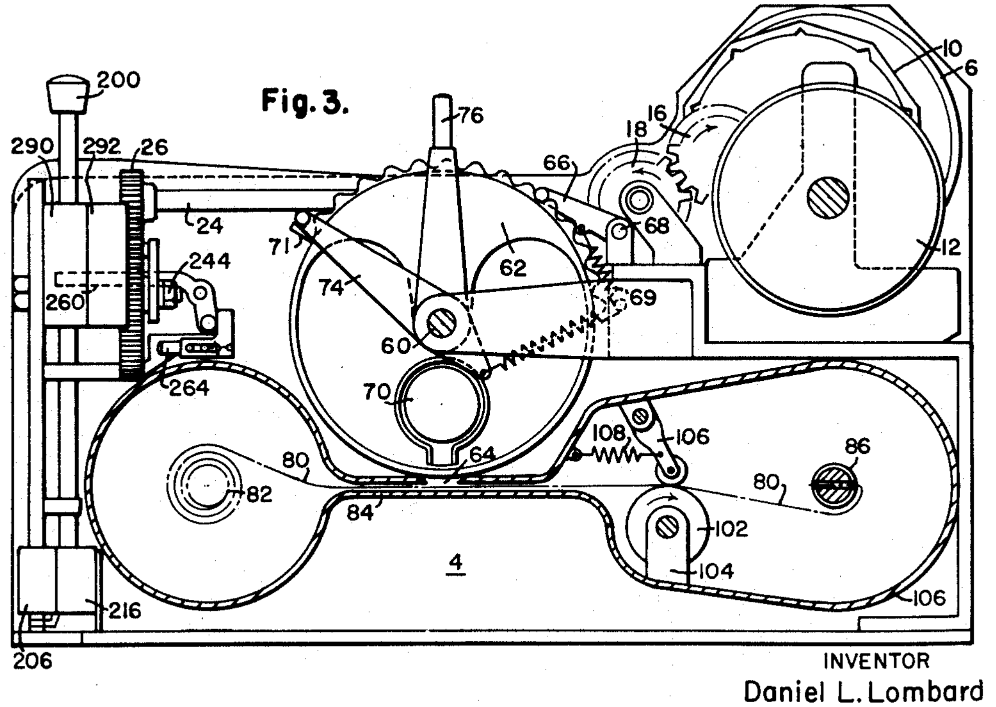
FIG. 3 is an elevational view of the opposite side of the illustrative embodiment shown in FIG. 1.
Figure 7:
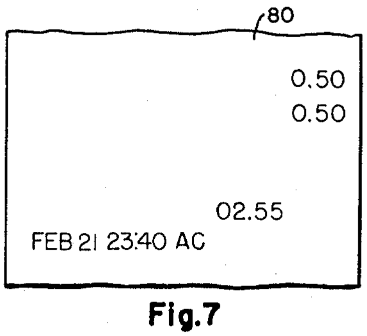
FIG. 7 is an example of the type of information recorded when practicing the present invention.

Briefly, the sections of discs may be transparent and have opaque numbers diametrically disposed from the indicated setting of the discs. A light sensitive film 80, shown in FIGS. 7 and 3, is passed tangentially across the transparent numbers aligned on the back of the disc sections. A light source extending through the disc sections is selectively energized in controlled time sequence to record the data on film 80 in a manner hereinafter described. This film is indexed to record the cost rate per initial three minute time period and the incremental cost rate for each one minute thereafter. As will be understood, the disc sections could be opaque and provided with transparent numbers with the same overall effect, the only difference being in one case the numbers will appear on film 80 as black on white, while in the other case they will appear as white on black.

The first section 3 of discs is driven by a gear train 14 from the synchronous motor 12 to a take-off gear 16. The take-off gear 16, in turn, drives gear 18 and shaft 20. At the opposite end of the shaft 20 right angle bevel gearing 22 drives a shaft 24 having a driving gear 26 mounted on its opposite end. The driving mechanism described is continually rotated by the synchronous motor 12, and the connecting gearing is selected such that the shaft 20 rotates one revolution every minute. The direction of rotation of the shafts 20 and 24 is indicated by arrows.

Figure 2:
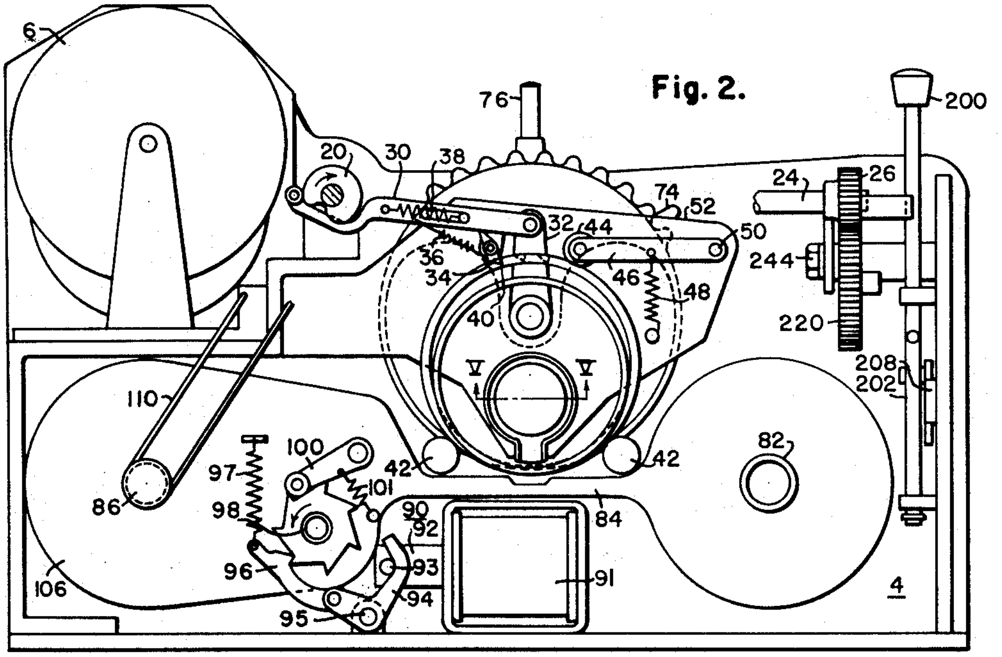
FIG. 2 is a side elevational view taken along the line II—II in FIG. 1.

Referring to FIG. 2 it can be seen that a selected portion of the shaft 20 is fashioned in a cam cross section. A cam follower 30 is pivotally secured at its opposite end to an arm 32. A pawl 34 is pivotally secured to the cam follower arm 30 and biased by a spring 36 connected therebetween. The combined action of a spring 38 mounted on the cam follower arm 30 and the spring 36 causes the pawl 34 to index the minute disc by engaging the notches 40 peripherally spaced adjacent the minute disc in the first section of the discs. As the pawl 34 is indexed every minute, appropriate lugs secured to the ten-minute indicating disc, the hour disc, the date of month disc and month disc turn to drive each other in speedometer fashion to provide a visual running indication of this information.

Since the discs of the first section 3 of necessity have different diameters, a tangential alignment of the transparent or opaque numbers corresponding to the visual numbers indicated is necessary to project their showing onto the film. In this respect, a pair of rollers 42 are spaced apart to receive each of the discs in the first section. A plurality of third rollers 44, each pivotally mounted on an associated pivot arm 46 and urged against its associated disc by means of a spring 48, holds the discs in tangential alignment against the pair of rollers 42. A common mounting post 50 is provided for each roller and arm 44, 46. The common mounting post 50 extends across the first section of discs from a side wall 52 secured to the frame of the mechanism 4. No central axle for the discs of the first section is provided, but rather the discs are free-loaded and positioned by the pair of rollers 42 and the associated roller 44 for each disc so that transparent or opaque numbers diametrically opposite the visual numbers shown to the viewer are tangentially lined up with the aperture between the light source and light sensitive film to be described hereinafter.

A cross section of a disc of the remaining sections can be seen from FIG. 3. Since these discs of the remaining sections can all be of the same diameter, they are keyed to a common mounting shaft 60. It is to be noted that each disc has a sector 62 for mounting it on the common center post 60. The sector 62 has a serrated surface on the periphery of the arc which it forms and has numbers peripherally spaced thereon. The serrated surface facilitates the manual adjustment of each disc to bring specified numbers on the disc to top dead center so as to provide the operator with a visual indication of its setting. Diametrically opposite the visual number provided for the operator on the top of each disc is a transparent or opaque number which aligns itself with an aperture 64 extending tangentially across the discs of all sections. In order to permit each disc to be individually preset, the sector 62 of each disc is cut-away to allow room for a light source 70 when the disc is positioned or rotated to the extreme number at either end of the sector. As was mentioned above, each of the discs is of transparent plastic material with the sector 62 blackened or darkened and numerals peripherally spaced thereon while opaque numbers are fashioned in the portion of the disc diametrically opposed to the visual number indicated. Once again it can be seen that upon energization of the light 70 the film 80 on the opposite side of the aperture 64 will record the opaque numbers aligned with the aperture 64.

Spring-loaded roller fingers 66 engage the serrated surface of each disc to preload each of the discs and provide a finger bias for the discs to react to finger pressure upon the manual setting of each of the discs. At the same time, each disc is then retained in the position set by the operator. The roller fingers 66 are mounted on a common arm 68 and spring biased as shown at 69.

Means are provided for clearing or resetting all of the discs upon completion of a particular long distance call. A lug 71 protruding from each disc will rotate a clearing arm 74 to an extreme determined by the extreme setting of any disc. A clearing handle 76 may be raised to an uppermost extreme and then brought down so that a ratchet connection between the clearing handle and clearing arm 76, 74 will cause the clearing arm 74 to engage each lug 71 of each disc and thereby clear or preset all the numbers indicated on the discs to zero or reference in preparation for the next long distance call.

Figure 5:
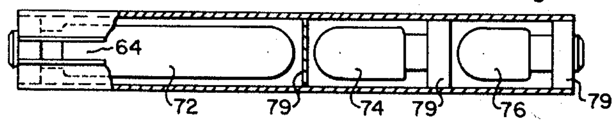
FIG. 5 is an enlarged view of a portion taken along the line V—V in FIG. 2.

Referring to FIG. 5, the light source 70 comprises three lamps connected end-to-end and extending through all sections of discs across the mechanism 4. The first lamp 72 is positioned within the discs of the first and second sections 3, 5 so that upon energization of the lamp 72 the information contained in the first and second sections of discs; namely, the date, time, and initials of the person called will be transferred to the light sensitive film on the other side of the aperture 64. The second lamp 74 is positioned within the discs of the third section 7 and will record the three-minute interval cost rate on the film. A third lamp 76 is positioned within the discs of the fourth section 9 to illuminate the opaque numbers in that section preset to indicate the incremental cost rate after expiration of the initial three-minute rate (i.e., the one-minute rate thereafter). Each lamp is separated within its common container 78 by means of wall partitions 79 designed to shield adjacent sections from the light emitted by any particular lamp.

The film 80 on which the desired information is to be recorded is stored on reel 82 and threaded through a guide 84 to a wind-up reel 86. The film 80 passes across the aperture 64 within the guide 84 where it receives the image of opaque or transparent numbers tangentially aligned across the aperture.

An indexing mechanism 90 (FIG. 2) indexes the film upon its exposure in preparation for the subsequent energization of another lamp within the tube 78. The mechanism 90 comprises a solenoid 91 controlling the position of a plunger 92. A finger 93 engages a lever 94 pivotally mounted on a stud 95. The feed pawl 96 is pivotally secured at one end and is urged by means of a spring 97 between its opposite end and a stationary point in the housing to seat in the teeth of a ratchet wheel 98.

It can be seen that the concave arm of the lever 94 is moved down and then upwardly in response to the energization and deenergization of the solenoid 91 thereby driving the ratchet wheel 98 one space in a counterclockwise direction. A roller stop 100 is urged by a spring 101 to seat in the teeth on the ratchet wheel 98 and serves as a detent each time the ratchet wheel is indexed one space.

A drive wheel 102 (FIG. 3) integral with the ratchet wheel 98 and rotatably mounted on the same support 104 within the wind-up reel housing 106 is likewise driven as the ratchet wheel 98 is indexed by the action of the plunger 92 of the solenoid 91. The drive wheel 102 is of material suitable for advancing the film each time the ratchet wheel 98 is indexed. A pivotally mounted roller wheel 106 urges the film 80 against the driving wheel 102 by means of a tension spring 108. In such manner the film 80 is positively indexed and advanced to the wind-up reel 86 each time the solenoid 91 is energized. A belt connection 110 provides a loose drive on the wind-up reel 86 to maintain slight torque on the wind-up reel 86 to receive the film 80 each time it is indexed. The belt is driven by a shaft extension 112 from the shaft 20.

In opertion, prior to lifting of the phone receiver, the discs of the second section 5 are manually preset to the initials of the person to be called. Upon lifting the receiver an operating bar 130 (FIG. 1) mounted on bearing pedestals 132 positioned on the attachment member 2 is rotated by the lever arm 134, spring biased in tension at 136. Lifting of the receiver removes the counterweight on the operating bar and it is turned within its bearing pedestals 132 so that a lever 140 will depress one end of a lever arm 142 mounted on a pivotal mount 144. The opposite end of the lever am is lifted when the lever 140 depresses the opposing end of the lever arm 142. A center positioned link 146 raises the plug end 148*a* of an actuating arm 148. The actuating arm 148 is pivotally mounted near its center with its opposing end 148*b* engaging the button on a limit switch 150. Upon operation of the pivotally mounted actuating arm 148, it can be seen that the limit switch 150 is closed, thereby energizing a synchronous motor 152. At the same time, the opposite or plug end 148*a* of the pivotally mounted actuating arm 148 withdraws a plug from a cam 154 driven by the synchronous motor 152. During the rotation of the cam disc 154 an actuating arm 156 will ride up on the raised portion of the cam disc 154 and thereby depress the plunger on the limit switch 158. The limit switch 158 energizes the lamp 72 thereby recording on the film 80 the information contained on the discs in the first and second section 3, 5. Accordingly, the month, day of the month, hour of the day and minute of the hour as well as the initials of the person to be called will be registered on the film. Further rotation of the cam disc 154 will cause an actuating arm 160 to ride up on the same raised portion of the cam disc and depress the plunger on the limit switch 162, thereby closing the limit switch for the duration of the raised portion. Closing of the limit switch 162 energizes the solenoid 91, thereby indexing the film one tooth distance on the ratchet wheel 98. The synchronous motor 152 is selected to drive the cam disc 154 at a speed which will allow the light 72 to be energized for a sufficient time period, for instance ten seconds, to expose the film 80. After the cam disc 154 has completed one complete revolution, the synchronous motor 152 is deenergized thereby bringing the disc 154 to rest.

Upon receipt from the operator of the cost information for the first three minutes of the call to be made and the one-minute incremental cost thereafter, the dials of the third and fourth sections 7 and 9 are manually set. Of course, with long distance dialing, the incremental cost rates may be previously obtained in the telephone directory and preset prior to the dialing of the long distance number. In either case a pushbutton 200 extending out of the top cover of the mechanism 4 is depressed upon connection with the party being called to thereby initiate the timing sequence to record the charges in elapsed time for the proposed call.

Depression of the pushbutton 200 causes its long stem 202 (FIGS. 2, 3 and 4) to engage the pivotally mounted lever arm 204, thereby depressing the operating button on the limit switch 206. When the limit switch 206 is closed, the lamp 74 is energized, thereby recording the information contained on the discs in the third section 7; namely, the three-minute cost rate. A segment friction gear 208 delays the action of a pair of springs 210 in returning the pushbutton 200 to an intermediate position between its initial position and its completely depressed condition by engaging the friction gear 212. In such a manner, the lever arm 204 remains depressed and the limit switch 206 closed for a period of time, say ten seconds, sufficient to allow the film to be exposed for a similar period of time to clearly record the information contained on the discs in section 5.

Just prior to return of the pushbutton 200 to the intermediate position, the actuating end of the pushbutton stem 202 engages another pivotally mounted lever arm 214 which depresses the operating button of a limit switch 216. Closure of the limit switch 216 energizes the solenoid 91 thereby once again indexing the ratchet wheel 98 and advancing the film 80 in preparation for the expiration of the three-minute period and commencement of the one-minute incremental rate thereafter.

For a clearer understanding of the operation of the present invention, it would be well to consider once again the drive gear 26 which is continually rotated by the synchronous motor 12. A timing gear 220 (FIG. 4) is aligned with driving gear 26. A long stud 222 and two short studs 224 and 226 are positioned on the timing gear 220 and extend out of one side thereof to strike a wheel 228 for the long stud 222 and a wheel 230 for each of the short studs 222 and 224.

In order for the timing gear 220 to be rotated, however, it is necessary that a walking gear 240 interconnect the driving gear 26 with the timing gear 220. The walking gear 240 is rotatably mounted at one end **242*a* of a teeter-totter or lever arm 242 which, in turn, is pivotally mounted on a common shaft 244 with the timing gear 220**.

The timing gear 220 has a plug hole 248 whereby initially the timing gear 220 is pinned, holding it stationary. With the timing gear 220 held statonary and not allowed to rotate, the walking gear 240 will be driven by the driving gear 26 out of engagement with the teeth of the driving gear 26 and timing gear 220. The walking gear 240 is thereby forced by the driving gear 26 to travel the periphery of the timing gear 220 and thereby disengages the gears. At this time the opposite end **242*b* of the teeter-totter or lever 242 assumes a floating position as determined by the walking gear 240**.

Briefly, upon depression of the pushbutton 200, the end **242*b* of the teeter-totter 242 is depressed, thereby forcing the walking gear 240 into engagement between the driving gear 26 and the timing gear 220 while at the same time the plug is removed from the plug hole 248, thereby allowing the timing gear 220 to rotate and start its timing cycle. As the timing gear 220 is rotated, the studs 222, 224 and 226** will strike their respective wheels for continued operation of the recording process as the telephone call progresses. The results of the studs striking the wheels will be more fully discussed hereinafter.

Upon depression of the pushbutton 200, the long stem 202 will depress an arm 260 pivotally mounted on a post 262 (FIG. 1). The opposite end of the arm 260 will lift the pin 264 from the hole 248 within the timing gear, as shown in FIG. 3, freeing the gear for rotation while at the same time causing an arm extension 266 (FIG. 1) to engage the opposite end **242*b* of the teeter-totter 242 depressing it downwardly and thereby forcing the walking gear 240 into engagement between the driving gear 26 and timing gear 220. With the walking gear held into engagement, the timing gear then commences its timing cycle. The laterally extending studs extending out of the face of the timing gear 220 are then free to engage their respective wheels 228 and 230**.

An additional wheel 270 common to all the studs 222, 224 and 226 is provided. Upon engagement of the wheel 270 with any of the studs the wheel 270 which is pivotally mounted on one end of the strike arm 272 causes its opposite end to displace the pivotally mounted lever arm 274 so that its opposite end, in turn, can depress the operating button on the limit switch 216 which is positioned beside switch 206 as shown in FIG. 3. Closure of the limit switch 216, in turn, energizes the solenoid coil 91 and thereby indexes the film. However, since no lamps are energized at this time, no recording is made on the film strip 80. No recording on the film strip 80 will be allowed until the three-minute interval has expired. Expiration of the three-minute interval is sensed by the timing gear 220 by its rotation of the long stud 222 over one complete cycle of its operation. At the end of one complete cycle of rotation, the long stud 222 engages wheel 228 which, in turn, depresses the cam surface formed in one end **276*a* of the lever 276. The opposite end 276*b* of the lever 276 has, on its extreme end, a cam surface which is abutted by an opposite cam surface at one end 278*a* of another lever 278 pivotally mounted at post 280. The lever 278 is biased by spring 281 thereby urging the cam surface on end 278*a* into engagement with the cam surface on end 276*b***.

It can be seen by engagement of the wheel 228 on the cam surface at end **276*a* that the cam surface at its opposite end 276*b* will slide out of engagement and the lever 278 will latch the lever 276 into a "tripped" position. The lever arm 276 will thereby continually depress the operating button for a limit switch 290. The limit switch 290 then is maintained in its closed position but this in itself is not sufficient to cause energization of the lamp 76 since a second limit switch 292 is connected in series circuit relationship with the contacts of the limit switch 290 and the third lamp 76**.

It is only upon displacement of the wheel 230 by either one of the short studs 224, 226 or the long stud 222 that the limit switch 292 will be closed thereby energizing the lamp 76 and recording the information on the discs of the last section 9 on the film 80. As the stud which closes the limit switch 292 continues its rotation, it displaces the wheel 270 whereupon the limit switch 216 is closed to energize the solenoid 91 and index the film. At one-minute intervals thereafter, a stud displaces the wheel 230 in a sequence of two short studs followed by the long stud. In each instance, the one-minute incremental cost rate is registered on the film and the film is indexed in preparation for the next stud, in its sequence position, to initiate recording of the incremental cost rate once again upon expiration of the next one-minute increment.

FIG. 7 illustrates the results obtained when practicing the present invention. In between printings on the film the film is indexed as shown by the displacement of the information entries on the film in FIG. 7. The information is tabulated on the film much like a supermarket tag. Initially the month, day of the month, time and initials of the person called is registered on the film. Next, the three-minute rate is recorded and three minutes thereafter the one-minute incremental cost rate is recorded for each minute for a complete history of each call. When desirable, means can be provided for recording the time at which the call was completed by merely interlocking the operating bar 130 to once again allow rotation of the cam 154 for a single rotation thereby energizing the lamp 72 so that the expired time will be shown by merely marking once more the information contained on the discs located in the first and second sections.

Upon completion of the call it is to be noted that the lever arm 274 must be unlatched and returned to its initial position. A stud 300 on the long stem 202 of the pushbutton engages the opposite end 278*b* of the lever 276 and overcomes its spring bias at 280 to allow the lever 276 to be returned to its initial position by means of the spring-loaded operating button of the limit switch 290 or by another spring biasing means. The cam surfaces on the ends 278*a* and 276*b* will once again abut one another to set the latching mechanism for the next long distance call. Return of the pushbutton 200 to its initial position is accomplished by manually pulling the pushbutton 200 back to its initial position. However, where desirable, a solenoid operated plunger may be used to return the pushbutton 200 to its initial position upon completion of the long distance call. The walking gear 240 will continue to rotate and drive the timing gear until the plug falls into the plug hole 248 thereby locking the timing gear into position for the next time sequence. The walking gear 240 will then disengage itself in the manner described previously.

Figure 6:
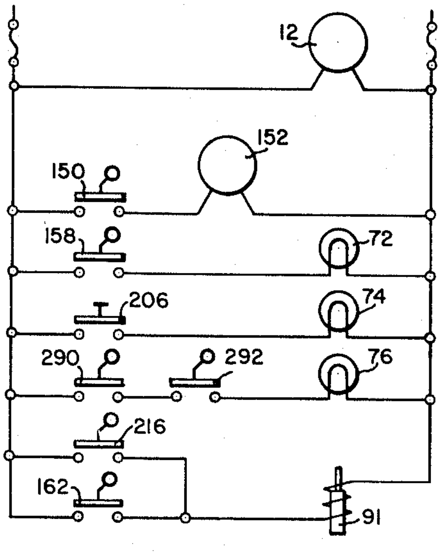
FIG. 6 is an electrical schematic diagram of the illustrative embodiment shown in FIG. 1.

Referring lastly to FIG. 6 wherein a schematic electrical diagram is laid out for the operation of the present invention, it is to be noted that the entire apparatus within the contemplation of the present invention is adapted for energization by single phase household or office current, readily available. The apparatus is protected by fuses located either within the machine or at the building's fuse box. The synchronous motor 12 is continually energized for the desk top time clock which provides a continual visual indication of time for the operator even though the telephone is not being used. The remaining limit switches, lamps, and the solenoid operating coil are positioned to record in sequence on the film the date, time, initials of the person called, the three-minute cost rate and the one-minute incremental cost rate in the sequence described previously with a resultant supermarket tag as shown in FIG. 7.

Figure 4:
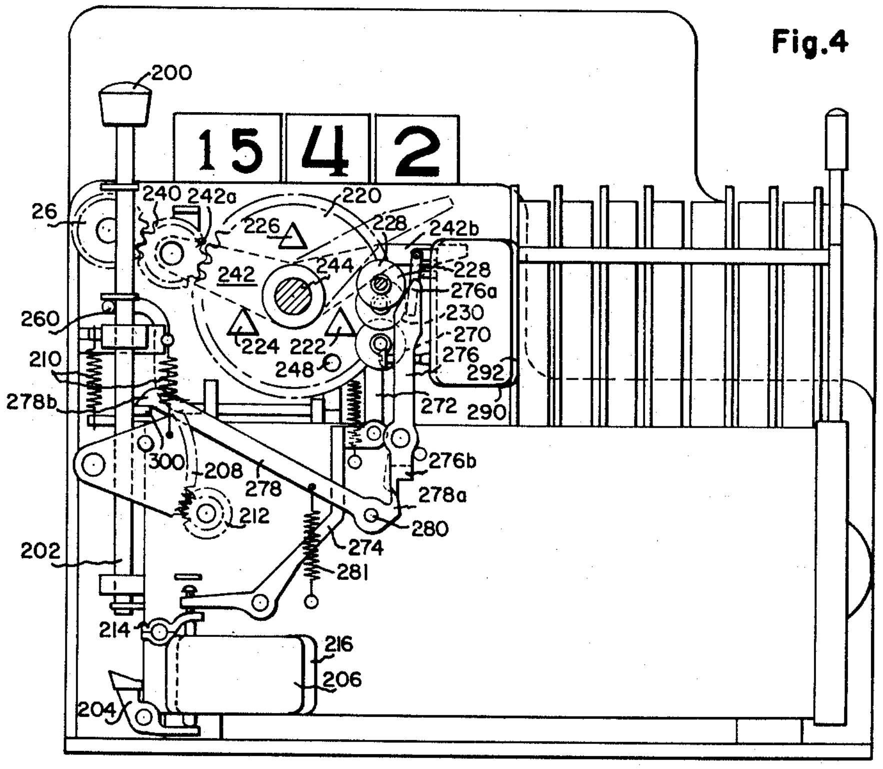
FIG. 4 is an end elevational view taken along the line IV—IV in FIG. 1.

Thus, with reference to FIG. 6, synchronous motor 152 will not be energized until limit switch 150 is actuated by lever arm 148 shown in FIG. 1. As the motor 152 rotates, limit switch 158 will first close to energize lamp 72 and expose on the film 80 the date, time and initials of the party being called. Thereafter, the cam 154 will close limit switch 162 to energize the solenoid 91 and advance the film. When the calling party is connected with the called party, he will depress pushbutton 200, thereby closing limit switch 206 to energize lamp 74 and expose on the film the first three-minute rate. As each stud 222–226 engages the wheel 270, solenoid 91 will be energized by limit switch 216 through lever 274 to advance the film, and this will occur once each minute. Timing gear 220 will rotate in a clockwise direction as shown in FIG. 4, and when the first stud reaches wheel 228 its length will be insufficient to trip limit switch 290. It will, however, strike wheels 230 and 270 to trip limit switches 292 and 216, respectively. When limit switch 292 is tripped, however, it will not energize lamp 76 since it is connected in series with switch 290 which is now open. When switch 216 is tripped, however, it will advance the film 80. The same condition will prevail for the second stud, but when the third stud reaches wheel 228, it will trip and lock in limit switch 290 in the manner described above. Thereafter, wheel 230 will be engaged by the long stud to energize lamp 76 and record the fourth minute charge on film 80. Similarly, wheel 270 will be engaged to advance the film, it being noted that the film was advanced three times before the fourth minute charge is recorded. Thereafter, each of the studs 222–226 will engage wheel 230 and 270 in succession to trip limit switches 292 and 216 to record each minute charge over the first three minutes while advancing the film after each recording.

While the present invention has been described with a degree of particularity for the purposes of illustration, it is to be understood that all equivalents, alterations and modications within the spirit and scope of the present invention are herein meant to be included. For instance, it is readily apparent that the present invention provides a timing and recording mechanism for use in any type of communication apparatus. The incremental times chosen are illustrative of those in common usage with respect to long distance telephoning but it is to be understood that any inital time duration and incremental time intervals thereafter may be chosen. When desirable, additional dissc may be provided to record additional information and, of course, the dials in any section may be omitted.

Further, it is to be understood that the manual means provided for clearing the information on the discs contained in the second through fourth sections may be manually operated upon completion of the call or, should it be desirable, electrical means may be used to reset the information shown thereon in preparation for the next long distance call. Likewise, the lamps 72, 74 and 76 may be replaced by solenoid-operated plungers, and raised numerals provided on the various discs, the arrangement being such that the solenoids, instead of the lamps, could be energized to print the indicia on paper rather than film.

I claim as my invention:

1. Information registering apparatus for a telephone comprising, in combination, a plurality of information storage sections; means for recording pertinent information in selected sections upon initiation of a telephone call; means for presetting the cost of an initial time interval in another section; means for presetting in a remaining section the cost of each incremental time interval thereafter; means for recording the information in said other section upon connection to the called party; constant speed drive means; a timing gear connected to said constant speed drive means and having studs selectively positioned on the face thereof; means including a latching device mechanically engageable with a preselected one of said studs for sensing the termination of the initial time interval and for recording the information in said remaining section; and means including a latching device mechanically engageable with any of said studs for recording the information in said remaining section each incremental time interval thereafter.

2. Information registering apparatus for a telephone comprising, in combination, a plurality of information storage sections; means for recording pertinent information in selected sections upon initiation of a telephone call; means for presetting the cost of an initial time interval in another section; means for presetting in a remaining section the cost of each incremental time interval thereafter; means for recording the information in said other section upon connection to the called party; constant speed drive means; a timing gear having studs selectively positioned on the face thereof; means for engaging said timing gear with said constant speed drive means upon connection with the party called; means including a latching device mechanically engageable with a preselected one of said studs for sensing the termination of the initial time interval and recording the information in said remaining section; and means including a latching device mechanically engageable with any of said studs for recording the information in said remaining section each incremental time interval thereafter.

3. The apparatus of claim 2 including means for resetting the information stored in said sections upon termination of the telephone call.

4. The apparatus of claim 2 including means for resetting the position of said timing gear for the next telephone call.

5. Information registering apparatus for a telephone comprising, in combination; a plurality of information storage sections; means for recording pertinent information in at least one of said sections upon initiation of a telephone call; electric motor constant speed drive means; a timing gear mechanically connected to said constant speed drive means and having stud means positioned thereon; means including a latching device mechanically engageable with said stud means for registering the termination of an initial time interval; and means including a device mechanically engageable with said stud means for registering incremental time intervals thereafter.

References Cited by the Examiner

UNITED STATES PATENTS

| | | | |
|---|---|---|---|
| 1,275,185 | 8/18 | Kurowski | 346—51 X |
| 1,332,372 | 3/20 | Zesbaugh | 346—20 |
| 2,014,525 | 9/35 | Goodrum | 179—7.1 |
| 2,095,298 | 10/37 | Tauschek | 179—7.1 |
| 2,229,308 | 1/41 | Recker | 179—7 |
| 2,322,602 | 6/43 | Terry | 346—51 X |
| 2,767,246 | 10/56 | Retallack | 179—7.1 |
| 2,911,144 | 11/59 | Lee et al. | 179—7.1 X |
| 3,075,698 | 1/63 | Fletcher | 179—7.1 |

ROBERT H. ROSE, *Primary Examiner.*

JOHN P. WILDMAN, WALTER L. LYNDE, *Examiners.*